Patented Jan. 16, 1923.

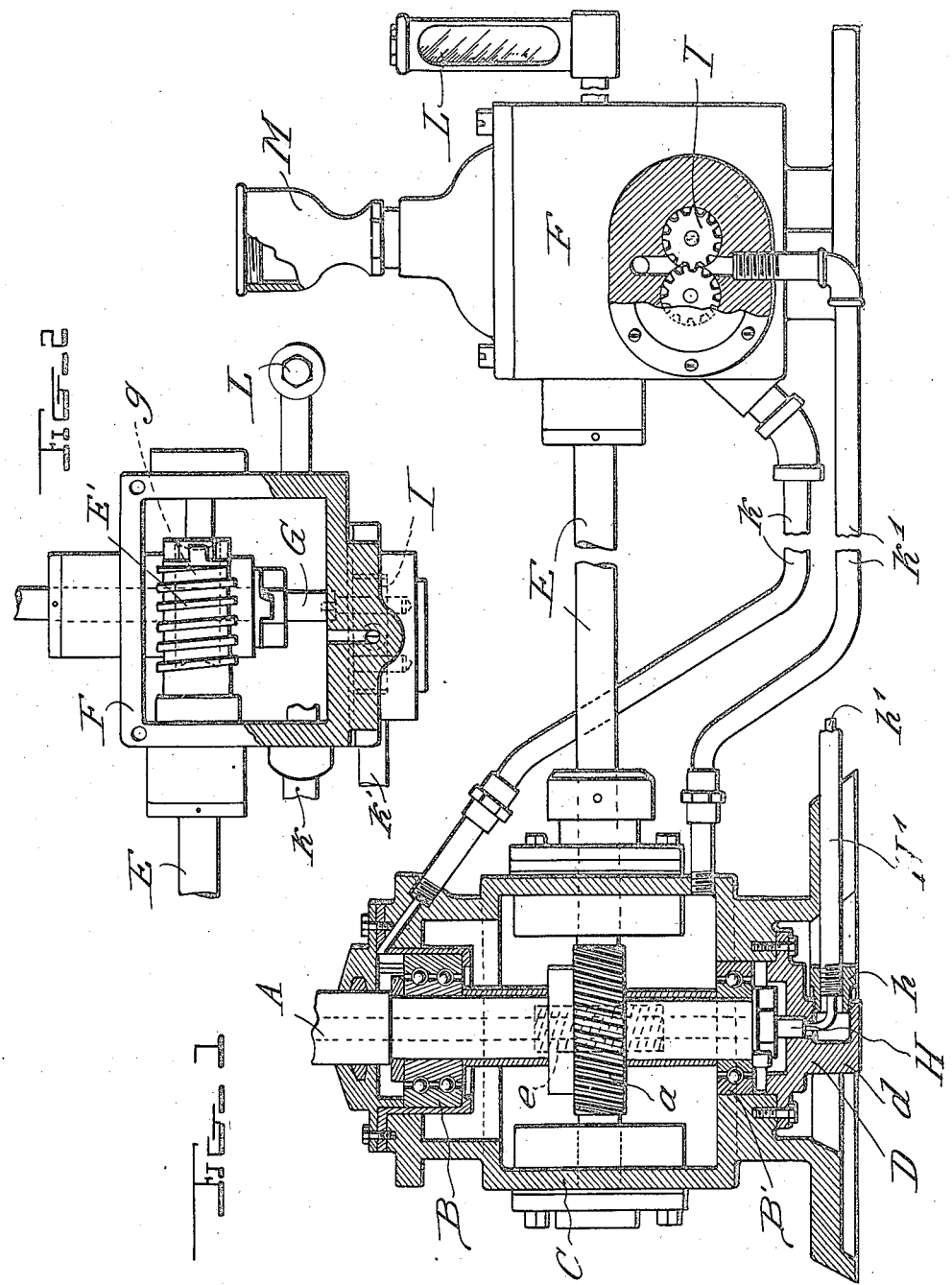

1,442,788

UNITED STATES PATENT OFFICE.

JOHN SCHEMINGER, JR., OF PROVIDENCE, RHODE ISLAND.

LUBRICATING SYSTEM.

Original application filed August 7, 1919, Serial No. 315,893. Divided and this application filed October 27, 1919. Serial No. 333,760.

*To all whom it may concern:*

Be it known that I, JOHN SCHEMINGER, Jr., a citizen of the United States, residing at Providence, in the county of Providence and State of Rhode Island, have invented certain new and useful Improvements in Lubricating Systems; and I do hereby declare the following to be a full, clear, and exact description of the invention, such as will enable others skilled in the art to which it appertains to make and use the same.

This invention relates to a method and apparatus for lubricating shaft bearings and driving gearing, such for example as the shaft bearings and associated driving gears of a rotary oil burner of the type illustrated and described in my application for a thermally controlled rotary oil burner, Serial No. 315,893 filed August 7, 1919; this being a division of said application.

The objects of the invention are to provide efficient and durable means for lubricating the bearings in which a driving shaft may be journaled and associated driving gearing, and more particularly the driving shaft of a rotary oil burner, although the invention is not limited in its application to any particular class of machines.

Another object is to cause a circulation of the lubricating medium through the shaft bearings and the casing or casings containing the gears on the driving and driven shafts of a rotary oil burner or other machine, so as to produce a cooling effect upon the bearings and driving gears and prevent overheating and injury thereto by means of the lubricating medium.

The invention will first be hereinafter more particularly described, with reference to the accompanying drawings, which are to be taken as a part of this specification, and then pointed out in the claims at the end of the description.

In said drawings Fig. 1 is a vertical sectional elevation of the lower portion of a rotary oil burner, also showing in side elevation, partly in section a worm gear casing and adjacent pump casing and pipes connecting the same with the burner casing for effecting a circulation of oil or other lubricant through the gear casings and bearings in which the vertical shaft of the burner or other machine has its bearings, and Fig. 2 is a plan view, partly in section, of the worm gear casing and adjacent housing for a rotary oil pump for effecting a circulation of oil or other lubricant through the gear casings and shaft bearings.

I have shown my improved lubricating system in connection with a fragmentary portion of a rotary oil burner, such as shown in my aforesaid application, for the purpose of illustrating the application of the invention to one of the uses for which it is especially designed, but it will be understood of course that the invention is not limited in its application to rotary oil burners, as it is adapted to be used in lubricating the shaft bearings and driving gears of various kinds of machines.

Referring to said drawings, in which the same reference letters are used to denote corresponding parts in different views, the letter A denotes a driven shaft, in this instance the vertical shaft of a rotary oil burner, having a spray plate or other device (not shown) on its upper end, and which is journaled in upper and lower annular radial and end-thrust bearings B, and B', of a well known type, arranged within a hollow casting C, having attached thereto on its underside a feed-pipe supporting bracket D; said shaft being supported in said bearings and carrying a helical gear $a$ in mesh with a smaller helical gear $e$ on a driving shaft E, which is journaled in bearings provided therefor, at one end, in said casing C, and at the other end, in a worm gear casing F. The shaft E also carries a worm gear E' arranged within the gear casing F in mesh with a worm gear $g$ on a shaft G, which has its bearings in the casing F and is operatively connected with one of the pistons of a rotary pump I, housed in or beside the casing F. The interior of the hollow casting C forms an oil chamber in which the helical gears $a$ and $e$ are housed and submerged in oil. Any suitable gears may be employed, but preferably the larger helical gear $a$ is constructed of fibre or composition to deaden sound. The feed-pipe support or bracket D may be bolted or otherwise secured to the base of the hollow casting C, and has on the underside thereof a boss $d$ for securing thereto an oil feed-pipe, when the device is used in connection with a rotary oil burner having a hollow shaft in which the feed pipe is enclosed, as shown. Instead of a hollow shaft having a fuel feed pipe therein, the driving or driven shaft may be solid and seated on the base of the casting C or other support therefor, in which case the supporting bracket D and associated feed pipe and connections may be dispensed with. A vertical feed pipe H, through which oil is supplied to the burner, extends upwardly through the hollow shaft A and has its lower end seated in a socket in the bracket D, which communicates with an opening in one side of the boss *d*, and in said side opening is screwed an interiorly threaded plug or sleeve *h* in which is inserted the end of the oil feed pipe H', through which and the vertical pipe H passes a smaller pipe *h'* for feeding a pilot light with gas. Sufficient space is provided between the outer and inner pipes for the passage of liquid fuel through the larger pipe.

The worm gear chamber F is provided with a gage L to indicate the level of the oil therein, and with an oil cup M having a removable cover for filling the chamber with oil. The rotary pump I preferably comprises two peripherally toothed rotating members, one member being fixed on a stub shaft, the inner end of which has a square or polygonal reduced extension fitted in a correspondingly shaped recess in the adjacent end of shaft G, whereby said member is adapted to rotate with the shaft G and impart rotary movement to the other rotating member in mesh therewith, so that when the shaft G is rotated oil will be drawn by suction from the worm gear chamber and forced through a pipe *k* into the upper end of the hollow casting C or the upper vertical shaft bearing B, from which it will flow downwardly into the gear chamber within the hollow casting C and from the latter sufficient oil will flow into the lower vertical shaft bearing B' to keep the latter submerged in oil. From the oil filled gear chamber within the casting C oil is drawn by the pump through a pipe *k'* back into the worm gear chamber F, whereby a constant flow of oil into and out of the gear chambers and through the vertical shaft bearings is maintained, and by the circulation of the oil the worm and helical gears and shaft bearings are thoroughly lubricated and at the same time a cooling effect is produced which prevents overheating of the bearings and driving gears.

The main driving shaft may be connected with the driving shaft of an electric or other motor or engine (not shown) by belt and pulley or any suitable driving gearing, for imparting rotary movement thereto and through it to the rotary pump pistons; such belt drive or other gearing being of any ordinary or well known construction. It may be desirable to utilize the same motor that rotates the vertical shaft of the burner, or other apparatus or machine, and the lubricating pump, for actuating the driving shaft of a liquid fuel supply pump (not shown) or other apparatus or machine, and to this end the shaft G may be operatively connected with the driving shaft of another machine or apparatus to be operated, or with one of the rotary pistons of a fuel supply pump (not shown) for actuating the latter in unison with the lubricating pump.

Having thus described my invention, what I claim as new and desire to secure by Letters Patent is:

1. A lubricating device comprising a hollow standard having an annular radial and end-thrust bearing secured therein at or near each end and an intermediate oil chamber, a vertical shaft journaled in said bearings, a horizontal shaft extending into said oil chamber and having a gear thereon in mesh with a gear on said vertical shaft, a rotary pump, an oil container in communication with said pump, a shaft operatively connected with said pump having a gear thereon housed in said oil container in mesh with a gear on said horizontal shaft and pipes connecting said pump with upper and lower portions of said standard, one of said pipes being connected with the intake and the other with the discharge from said pump, whereby a continuous circulation of oil is effected through said standard and around the shaft bearings and gearing housed therein and in said oil container.

2. In combination, a hollow standard having an annular radial and end-thrust bearing secured therein at or near each end and an intermediate oil chamber, a vertical shaft journaled in said bearings, a horizontal shaft extending into said oil chamber and having a gear thereon in mesh with a gear on said vertical shaft, a rotary pump, a casing having an oil chamber in communication with said pump, a shaft journaled in said casing and having one end operatively connected with said pump, said shaft also having a gear thereon housed within the oil chamber in said casing and meshing with a gear on said horizontal shaft, and pipes connecting said pump with upper and lower portions of said standard, one of said pipes being connected with the intake and the other with the discharge from said pump.

3. In combination, a hollow standard having an annular radial and end-thrust bearing secured therein at or near each end and an intermediate oil chamber, a vertical shaft journaled in said bearings and having a gear thereon housed in said oil chamber, a horizontal shaft extending into said oil chamber and having a gear thereon in mesh with the gear on said vertical shaft, a worm-gear casing, a gear on said horizontal shaft in mesh with a gear on another shaft journaled in said worm-gear casing, the latter shaft being operatively connected with a rotary pump arranged beside said worm-gear casing, and pipes connecting the intake and discharge ports of said pump with upper and lower portions of said hollow standard, whereby oil is caused to circulate with a cooling effect through said hollow standard and through or around the bearings and gearing housed therein.

4. A gear and shaft-bearing lubricating system comprising a shaft-supporting structure having an oil chamber therein, a shaft journaled in said structure having a gear thereon in said oil chamber in mesh with a gear on a main driving shaft, the latter having a bearing in said structure, a gear casing having an oil chamber therein containing a gear fixed on said main driving shaft in mesh with a gear on a shaft journaled in said gear casing; said main driving shaft also having a bearing in said gear-casing, an oil pump in communication with the oil chamber in said gear casing, and pipes connecting the oil chamber in said structure with the intake and discharge from said pump, whereby oil may be caused to circulate continuously through said gear chambers and shaft bearings.

5. In combination, a hollow shaft-supporting structure having an oil chamber therein, a vertical shaft having its bearings in said structure and having a gear thereon within said oil chamber, a gear casing having an oil chamber therein, a rotary oil pump having its intake in communication with the latter oil chamber, pipes connecting the oil chamber in said structure with the intake and discharge from said pump, a shaft journaled in said gear casing, and operatively connected with a piston of said pump, and a driving shaft having its bearings in said structure and gear casing and carrying at one end a gear in mesh with the gear on said vertical shaft and at the other end a gear in mesh with a gear on the pump-operating shaft, whereby oil may be caused to circulate continuously through said oil chambers and shaft bearings and a cooling effect produced.

6. A lubricating apparatus for shaft bearings and driving gearing, comprising a hollow standard having a vertical shaft journaled therein in bearings located at or near its upper and lower ends, the intermediate portion of said standard forming an oil chamber, a driving shaft extending into said oil chamber and having a gear thereon in mesh with a gear on said vertical shaft, a gear casing having an oil chamber therein enclosing a gear fixed on said driving shaft and in mesh with a gear on a pump operating shaft, an oil pump in communication with the oil chamber in said gear casing, and pipes connecting upper and lower portions of said hollow standard with the intake and discharge from said pump, whereby oil may be continuously circulated through both of said oil chambers with a cooling effect upon the gearing housed therein.

7. In combination, a hollow standard having an annular radial and end-thrust bearing secured therein at or near each end, the intermediate portion thereof forming an oil chamber, a vertical shaft journaled in said bearings, a driving shaft extending into said oil chamber and having a gear thereon in mesh with a gear on said vertical shaft, and means for lubricating said shaft bearings and intermeshing gears and producing a cooling effect thereon, said means comprising a pump, a shaft operably connected with said pump, a gear on said pump shaft in mesh with a gear on said driving shaft, and pipes connecting said pump with upper and lower parts of said hollow standard, one of said pipes being connected with the intake and the other with the discharge from said pump, whereby a continuous circulation of oil is effected through said hollow standard and through or around the shaft bearings and intermeshing gears housed therein.

In testimony whereof I affix my signature in the presence of two witnesses.

JOHN SCHEMINGER, Jr.

Witnesses:
C. M. OFFUTT,
THOMAS F. BURKE.